US009288135B2

(12) United States Patent
DeCusatis et al.

(10) Patent No.: US 9,288,135 B2
(45) Date of Patent: Mar. 15, 2016

(54) MANAGING DATA FLOWS IN SOFTWARE-DEFINED NETWORK USING NETWORK INTERFACE CARD

(71) Applicant: International Business Machines Corporation, Armonk, NY (US)

(72) Inventors: Casimer M. DeCusatis, Poughkeepsie, NY (US); Keshav G. Kamble, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 161 days.

(21) Appl. No.: 14/105,442

(22) Filed: Dec. 13, 2013

(65) Prior Publication Data

US 2015/0172201 A1 Jun. 18, 2015

(51) Int. Cl.
*H04L 12/721* (2013.01)
*H04L 12/801* (2013.01)
*H04L 12/863* (2013.01)
*H04L 12/46* (2006.01)
*G06F 9/455* (2006.01)
*H04L 12/825* (2013.01)

(52) U.S. Cl.
CPC ............ *H04L 45/14* (2013.01); *H04L 12/4633* (2013.01); *H04L 47/12* (2013.01); *H04L 47/263* (2013.01); *H04L 47/62* (2013.01); *G06F 9/45533* (2013.01); *G06F 2009/45595* (2013.01); *H04L 47/25* (2013.01); *H04L 47/6215* (2013.01)

(58) Field of Classification Search
CPC ..... H04L 47/10; H04L 47/2408; H04L 47/12; H04L 47/2441
See application file for complete search history.

(56) References Cited

U.S. PATENT DOCUMENTS

| 7,948,888 | B2 * | 5/2011 | Gusat et al. | .................... 370/232 |
| 8,270,413 | B2 * | 9/2012 | Weill et al. | ............... 370/395.53 |
| 2012/0230196 | A1 | 9/2012 | Jain et al. | |

FOREIGN PATENT DOCUMENTS

WO 2012114398 A1 8/2012

* cited by examiner

*Primary Examiner* — Chandrahas Patel
(74) *Attorney, Agent, or Firm* — Cantor Colburn LLP; Steven Chiu

(57) ABSTRACT

Embodiments relate to managing data flows at a network interface card (NIC). A computer implemented method for managing data flows at the NIC of a host is provided. The NIC includes a port. The method receives, from a virtual forwarding element executing in the host, a packet that belongs to a data flow. The method identifies, by the NIC, one of several queues for storing data flows to be sent out of the host through the port based a mapping between the data flows, the queues, and a plurality of tunnels. The method places the packet in the identified queue in order to send the packet out of the host through the port.

8 Claims, 8 Drawing Sheets

US 9,288,135 B2

MANAGING DATA FLOWS IN SOFTWARE-DEFINED NETWORK USING NETWORK INTERFACE CARD

BACKGROUND

The present invention relates to computer networks, and more specifically, to managing data flows in a software-defined network using a network interface card.

In a data center environment, a typical host machine runs many virtual machines (VMs) that provide services to or receive services from other virtual or non-virtualized machines. In providing or receiving services, the VMs in the host may communicate among each other or may communicate with other VMs executing in other hosts. The communications between the machines are in the form of data flows, which include data packets that have common properties (e.g., common headers). In some cases, the VMs in the host share one or more network interface controllers attached to the host to send or receive data flows.

SUMMARY

Embodiments include a method, system, and computer program product for managing data flows in a software-defined network (SDN). According to an embodiment of the present invention, a computer implemented method for managing data flows at a network interface card (NIC) of a host is provided. The NIC includes a port. The method receives, from a virtual forwarding element executing in the host, a packet that belongs to a data flow. The method identifies, by the NIC, one of several queues for storing data flows to be sent out of the host through the port based a mapping between the data flows, the queues, and a plurality of tunnels. The method places the packet in the identified queue in order to send the packet out of the host through the port.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
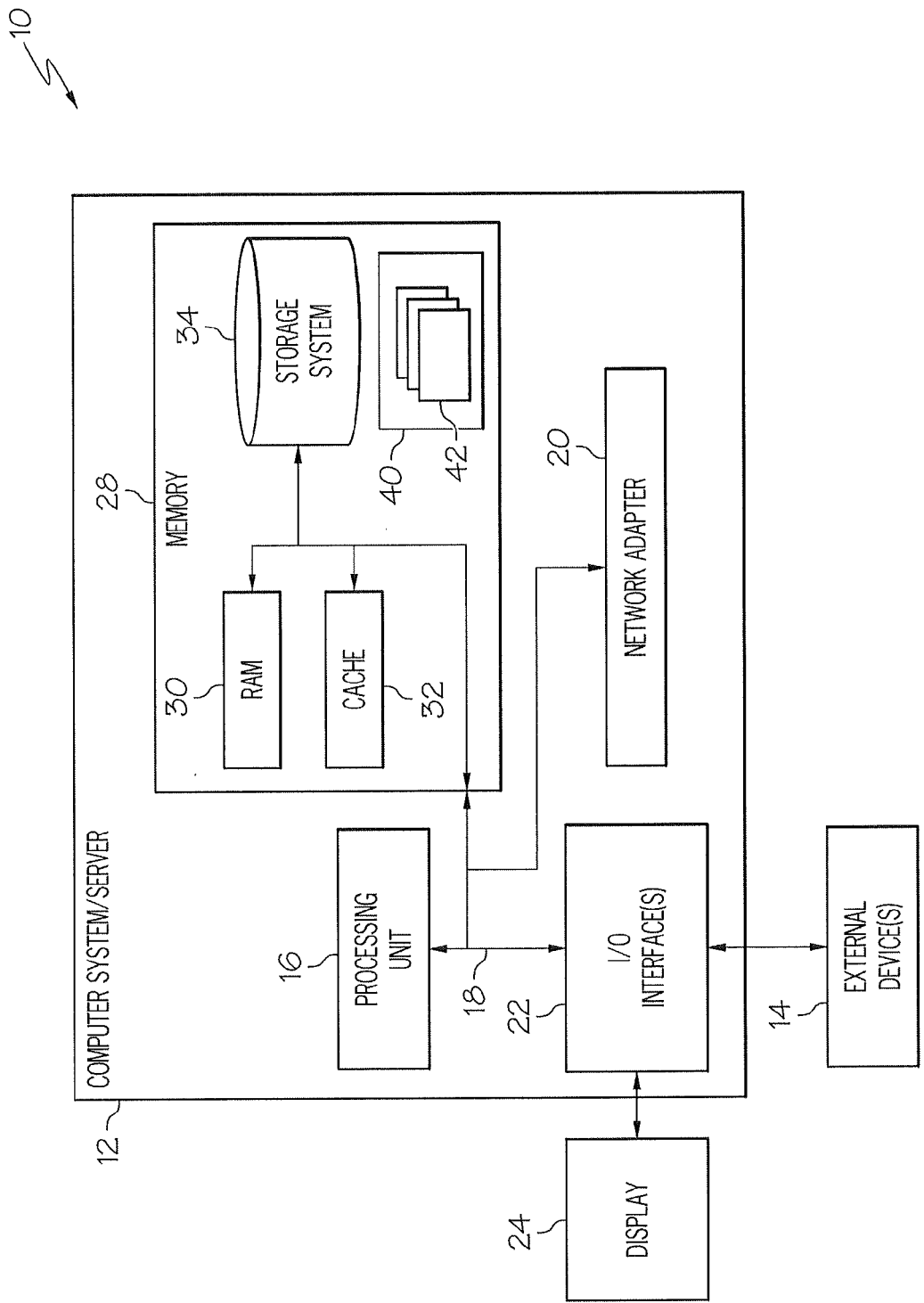
FIG. 1 depicts a cloud computing node in accordance with an embodiment.

Exemplary embodiments relate to managing data flows originating from virtual machines executing in a host by a physical network interface card (NIC) of the host and by a physical forwarding element (e.g., a switch or a gateway) communicatively connected to the NIC. Typically, a set amount of physical resources (e.g., one or more physical buffers or queues) is available for a physical outgoing port of the NIC. All data traffic that is sent out of the host through the outgoing port of the NIC shares the associated physical resources. In an embodiment, the NIC is configured to partition the physical buffer into several logical queues and associate each data flow originating from within the host with a logical queue. The NIC stores a data flow in the associated logical queue before sending the data flow out of the host. Using these logical queues, the NIC is able to adjust data rate for the data flows individually.

In an embodiment, the NIC encapsulates the packets of a data flow with a tunnel header (also referred to as an underlay network header or an outer network header) that defines a tunnel between two hosts or between a host and an overlay gateway switch. The network components (e.g., switches, routers, gateways, etc.) other than overlay gateway switches in the network that connects the two hosts would typically use only the tunnel header to forward the packets from one host to the other host. That is, the network components would be oblivious to the inner, encapsulated packets of the tunneled data flow. In an embodiment, a network component that receives the tunneled data flows from the NIC is configured to recognize the different data flows within the tunnel by looking into the headers of the inner packets. By recognizing the data flows in the tunnels, the network component may request the NIC to adjust data rates individually for the data flows rather than requesting the NIC to adjust data rate for all tunneled data flows as a whole.

It is understood in advance that although this invention includes a detailed description on cloud computing, implementation of the teachings recited herein are not limited to a cloud computing environment. Rather, embodiments of the invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a block diagram of a cloud computing node is shown. Cloud computing node 10 is only one example of a suitable cloud computing node and is not intended to suggest any limitation as to the scope of use or functionality of embodiments described herein. Regardless, cloud computing node 10 is capable of being implemented and/or performing any of the functionality set forth hereinabove.

In cloud computing node 10 there is a computer system/server/host 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device, also referred to as a processing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 may include a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., NIC, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
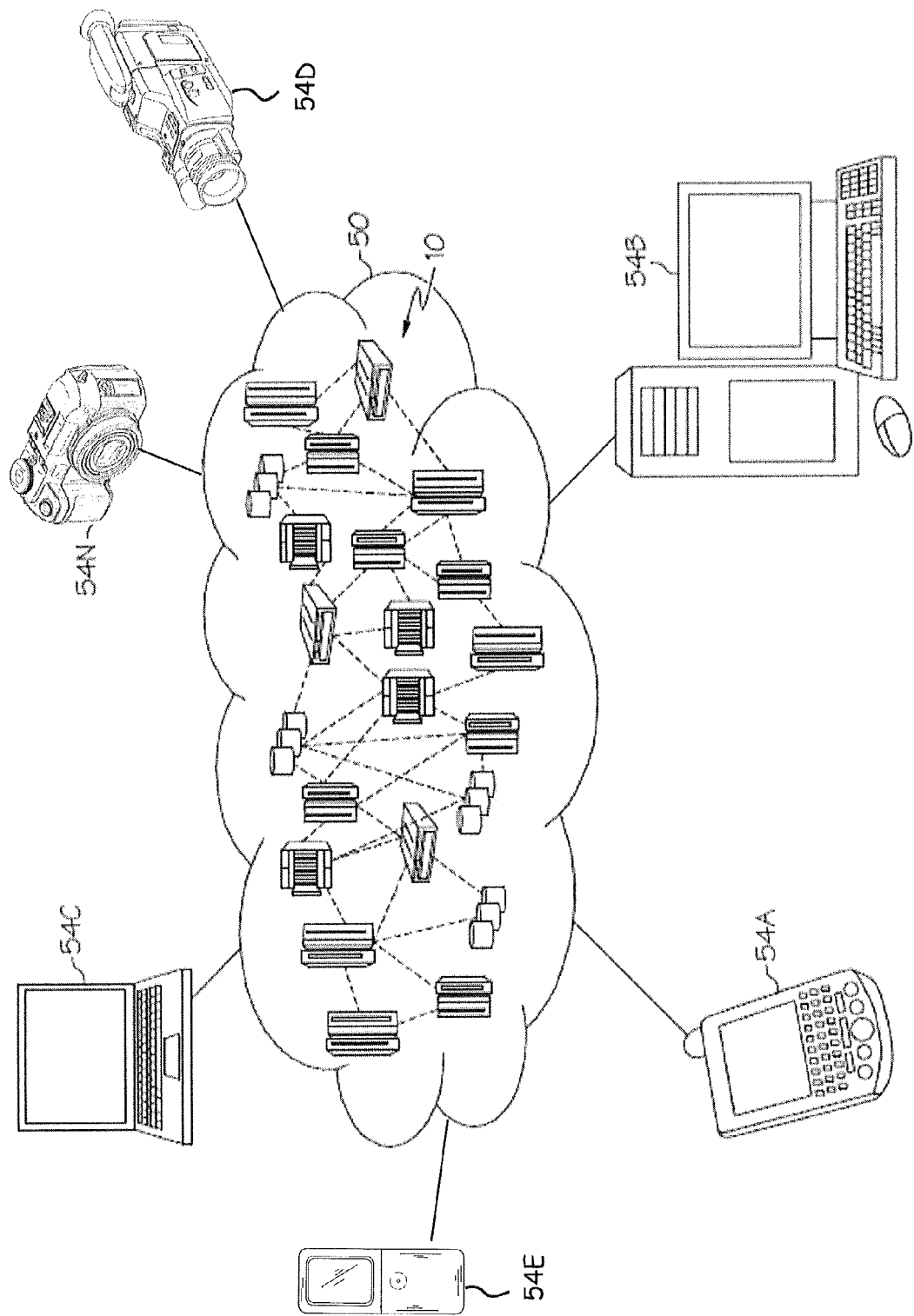
FIG. 2 depicts a cloud computing environment in accordance with an embodiment.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, digital video camera 54D, digital audio recording device 54E, and/or digital still camera 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
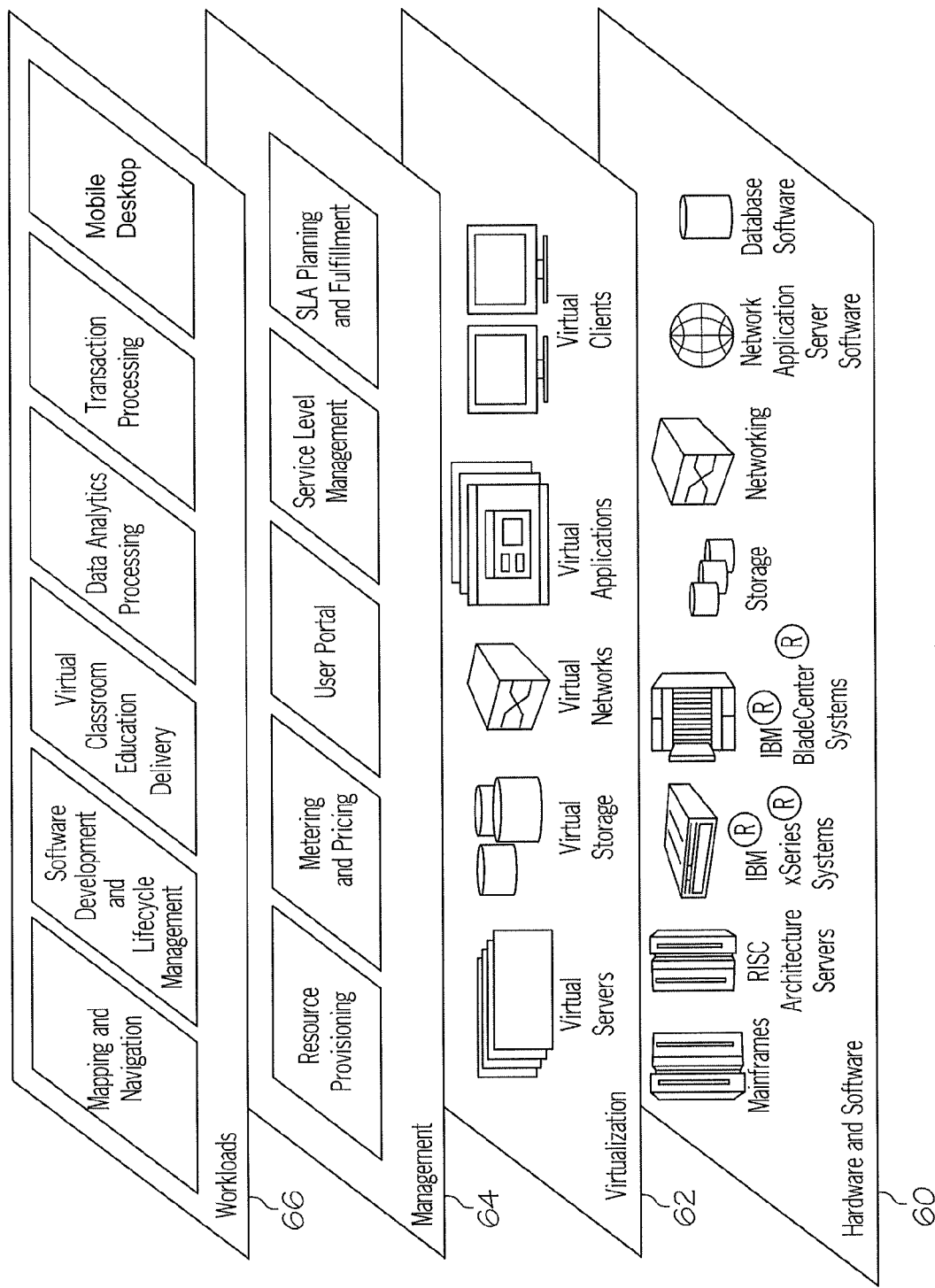
FIG. 3 depicts abstraction model layers in accordance with an embodiment.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components such as NICs, hubs, switches, routers, bridges, and gateways. Examples of software components include network application server software, in one example IBM WebSphere® application server software; database software, in one example IBM DB2® database software; and software-defined networking software, in one example IBM SDN for Virtual Environments (SDN VE). (IBM, zSeries, pSeries, xSeries, BladeCenter, WebSphere, DB2, and SDN VE are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual overlay networks, virtual private networks, and virtual network elements such as virtual switches, routers; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

Figure 4:
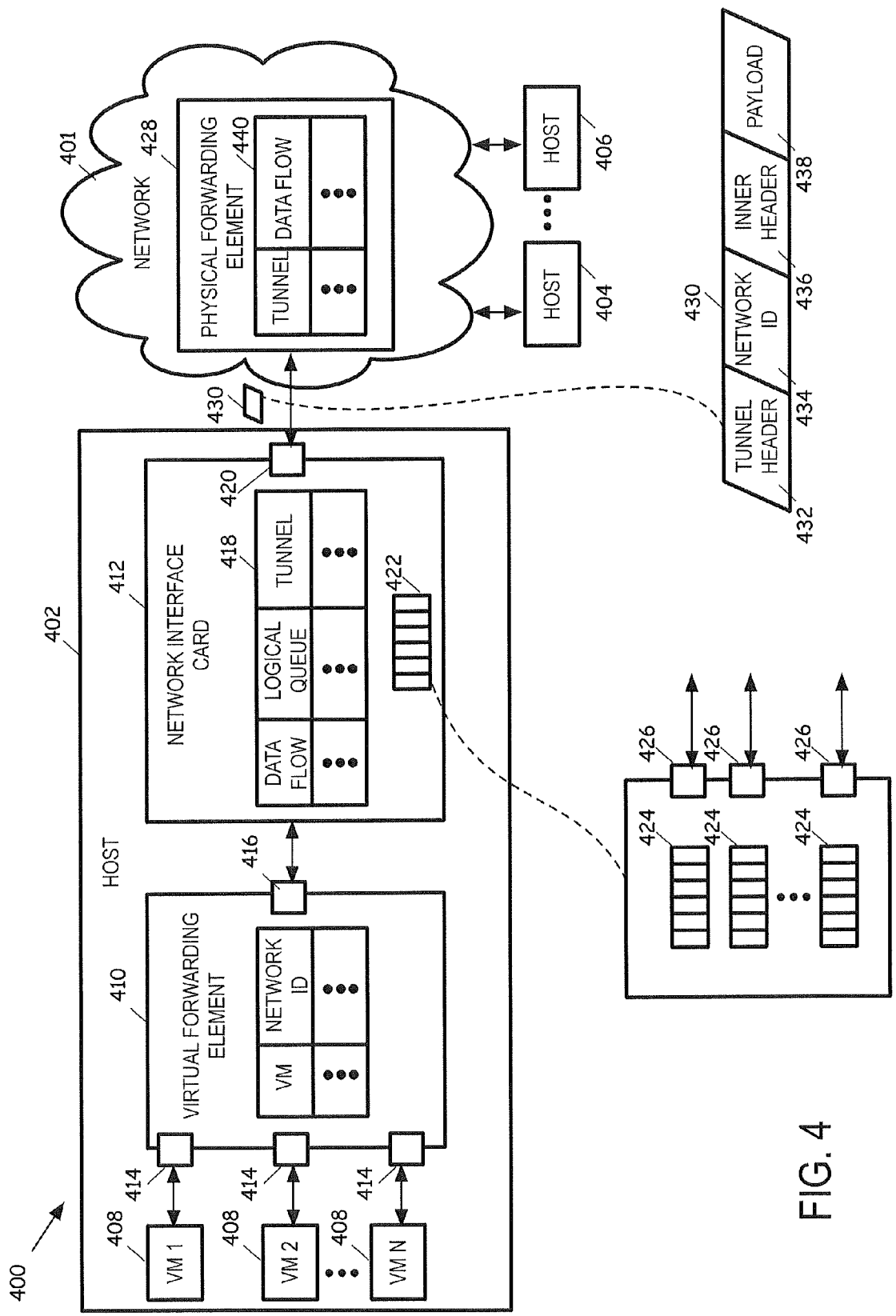
FIG. 4 depicts a block diagram of a system for managing data flows in accordance with an embodiment.

Turning now to FIG. 4, an example of a system 400 will now be described in greater detail. In the example depicted in FIG. 4, the system 400 is a data center environment including several hosts 402, 404, and 406 configured to communicate over the network 401. In an embodiment, a host in the system 400 hosts several virtual machines (VMs) and virtual forwarding elements (e.g., virtual switches). Depending on its processing and memory resources, a host may run hundreds of VMs and one or more virtual forwarding elements that forward data for the VMs. A host in the system 400 also includes one or more NICs attached to or integrated with the host.

The VMs operating in the hosts may belong to the same tenant or different tenants in the data center environment. The virtual forwarding elements operating in the hosts of the system 100 may isolate VMs of different tenants such that the data flows coming in and out of a VM of one tenant cannot be accessed by a VM of another tenant. In an embodiment, the virtual forwarding elements achieve the isolation of the data flows by encapsulating the data flows of different tenants with different network identifiers. In an embodiment, the network identifiers identify the virtual networks by which the VMs of different tenants are connected. The virtual forwarding elements do not forward a data flow encapsulated with a particular network identifier to a VM that is not associated with the particular network identifier. In some cases, a tenant may have more than one virtual network, and the VMs of this tenant that are connected by different virtual networks are isolated from each other. In this patent application, it is assumed that one tenant uses one virtual network to connect the tenant's VMs. That is, in this application, a "tenant" means a "virtual network" unless indicated otherwise.

Examples of the network identifiers include a Virtual Extensible LAN (VXLAN) identifier, an SDN VE tenant identifier, and Network Virtualization using Generic Routing Encapsulation (NVGRE) tenant identifier. In an embodiment, a network identifier is a 24-bit space that so that more than 16 million virtual overlay networks can be uniquely identified.

As shown, the host 402 of the system 400 in this example includes several VMs 408, a virtual forwarding element 410, and a NIC 412. The VMs 408 are provisioned by a hypervisor (not shown) of the host 402. In an embodiment, the VMs 408 are end systems that execute client and/or server applications. The VMs 408 may communicate with each other or with other end systems operating in other hosts of the system 400 through the virtual forwarding element 410.

The virtual forwarding element 410 includes several ports 414 and 416. The ports 414 and 416 are virtual ports or virtual interfaces (VIFs) of the virtual forwarding element 410. The virtual forwarding elements 410 receive and send out the packets through these virtual ports. In this example, the ports 414 are configured to receive and send packets from and to the VMs 408. The port 416 is configured to receive and send packets from and to the NIC 412. In particular, the packets that come in or go out of the virtual forwarding element 416 through the port 416 include packets that are sent to or received from the end systems operating in other hosts of the system 400.

As shown, the NIC 412 in this example includes a port 420, a buffer 422, and a mapping depicted as a table 418. The port 420 is a physical port of the NIC 412. The buffer 422 is an I/O (input/output) buffer. That is, the buffer 422 is a physical memory space for storing packets before the packets enter or exit the host 402 through the port 420. In an embodiment, the NIC is configured to partition the physical buffer 422 into a number of logical or virtual queues 424 (e.g., eight logical queues) as depicted at the bottom of FIG. 4. The NIC 412 maps the data flows coming from and going to the virtual forwarding element 410 to the logical queues 424 and stores the packets of the data flows in the associated logical queues before sending the packets out of the port 420 or to the virtual forwarding element.

The NIC 412 uses the logical queues 424 to control data rate for the data flows individually. For instance, the NIC 412 may implement a different Quality of Service (QoS) policy for each data flow. In an embodiment, the NIC 412 assigns different priority levels to the logical queues 424 and thereby assigns the priority levels to different data flows. With these logical queues with different priority levels, the NIC 412 of an embodiment implements enhanced transmission selection (ETS) and priority-based flow control (PFC). That is, the NIC 412 may send data flows out by favoring the data flows with higher priority levels over the data flows with lower priority levels. The NIC 412 may block or throttle a particular data flow associated with a particular priority level to facilitate lossless transmission of the packets of the particular data flow.

By partitioning the physical buffer into a number of logical queues, the NIC creates the same number of logical ports 426 out of the physical port 420. In an embodiment, the logical ports 426 does not have their own network addresses (e.g., Internet Protocol (IP) and media access control (MAC) addresses) and share the network addresses of the physical port 420. In another embodiment, each of the logical ports 426 is associated with one of virtual NICs (not shown) of the VMs 408 of the host 402 and has its own network addresses.

In an embodiment, the NIC 412 encapsulates the packets of a data flow (which are already encapsulated with a network identifier by the virtual forwarding element 410) with a tunnel header that defines a tunnel between the host 402 and another host in which the destination VM of the data flow operates. The tunnel header includes the network addresses of the physical port 420 as the source addresses because these are the addresses of the host 402 for the connection to the other host.

Once the data flows stored in the logical queues exit the host 402 through the physical port 420, the network components in the network 401 forward the data flow to the destination VM operating in the other host based on the addresses in the tunnel header. That is, the network components, which are oblivious to the network identifier and the inner headers of the tunneled packets, forward the packets to the host of the destination VM. These network components therefore would not recognize different data flows in the tunnel.

According to an embodiment of the invention, a network component in the network 401 is configured to recognize different data flows in a tunnel by looking at the network identifier and the inner headers of the packets of the data flows. For instance, the physical forwarding element 428 (e.g., a switch) in an embodiment is manufactured to or configured to recognize different data flows in a tunnel. When the physical forwarding element 428 receives a tunneled packet 430 from the NIC 412, the physical forwarding element 428 looks at the tunnel header 432, the network identifier 434, and the inner header 436 of the packet. The inner header 436 and the payload 438 makes up the original form of the packet that one of the VMs 408 sends to the virtual forwarding element. The network identifier 434 that identifies a virtual overlay network is added by the virtual forwarding element 410. The tunnel header is added by the NIC 412.

The inner header 436 includes the network addresses of the source and destination VMs. That is, in an embodiment, the inner header 436 includes an inner Ethernet header and an inner IP header. The tunnel header or the outer header 436 includes the network addresses of the host 402 and another host, which are the endpoints of the tunnel. The network addresses of the host 402 are those of the physical port 420. That is, in an embodiment, the tunnel header 432 includes an outer Ethernet header, an outer IP header, and an outer transport header (e.g., User Datagram Protocol (UDP) header and Transmission Control Protocol (TCP) header, etc.).

In an embodiment, the physical forwarding element 428 creates a mapping between the data flows and the tunnels. In the mapping, different tunnels are defined by different tunnel headers (e.g., tunnels that have the host 402 at one endpoint and different hosts 404, 406 at the other endpoint). Different data flows are defined by different network identifiers and different inner headers. The mapping created by the physical forwarding element 428 is depicted as a table 440.

In an embodiment, the physical forwarding element 428 uses the mapping between the data flows and the tunnels to help the NIC 412 in implementing the ETS and PFC. For instance, the physical forwarding element 428 may receive a congestion message for a tunnel from another network component downstream in the network 401. With the mapping, the physical forwarding element 428 may identify the data flows associated with the tunnel. That is, because the congestion message that the physical forwarding element 428 receives is based on the network addresses defining a tunnel, the physical forwarding element 428 uses the mapping to identify the data flows for the tunnel. The physical forwarding element 428 notifies the NIC 412 of the data flows contributing to the congestion (also referred to as network congestion). The NIC 412 may then throttle the data flow using the logical queues that are associated with the data flows. In an embodiment, the NIC 412 notifies the virtual forwarding element 410 of the congestion, which in turn may control the data flows by throttling the data flows originating from the VMs.

In an embodiment, the congestion message that the physical forwarding element 428 receives is of a first format that is not capable of specifying data flows. In an embodiment, the physical forwarding element 428 is configured to generate a new congestion message that is of a second format that is capable of specifying data flows. In an embodiment, the physical forwarding element 428 notifies the NIC of the data flows contributing to the congestion by sending the new message of the second format to the NIC 412.

Figure 5:
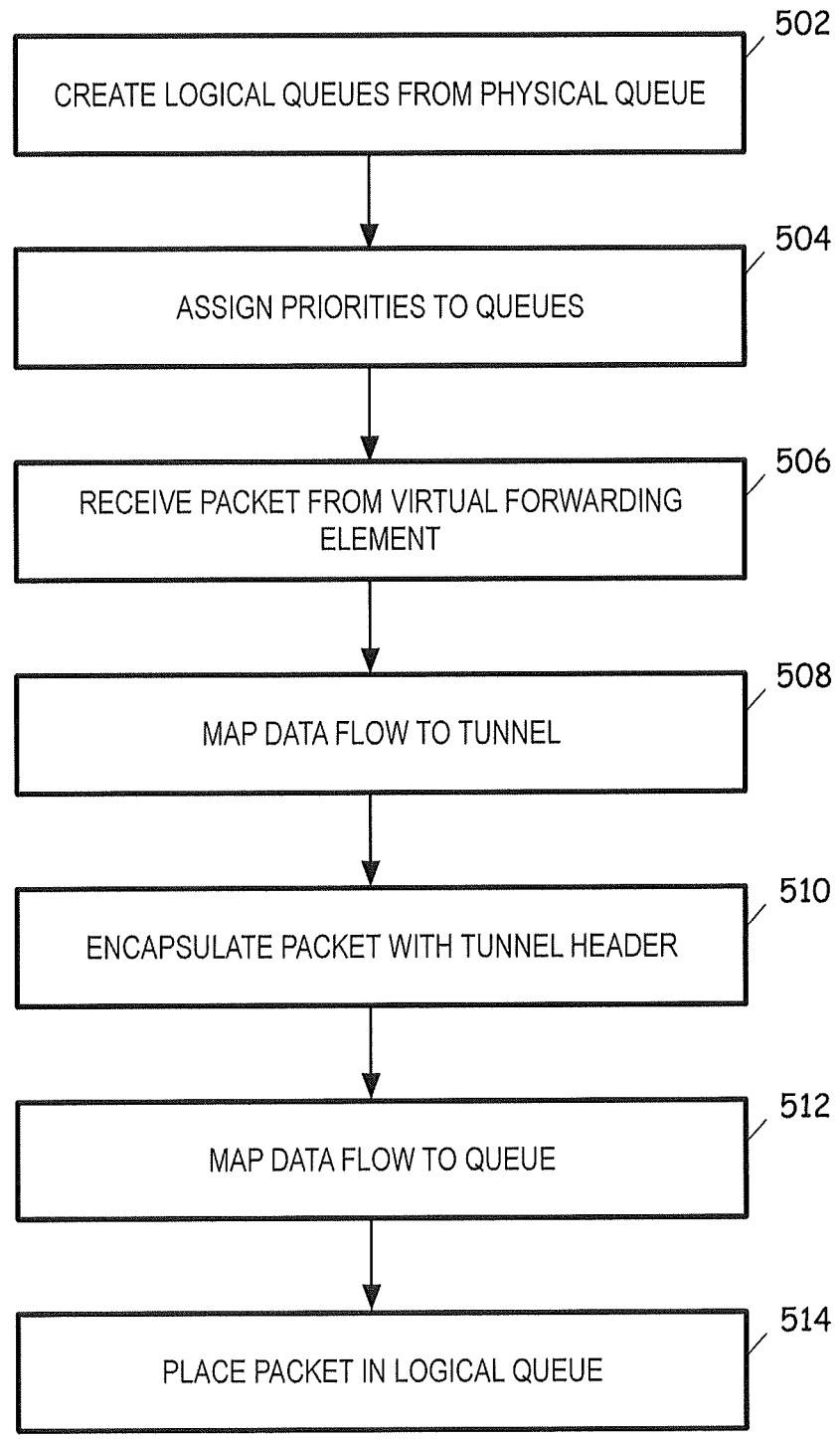
FIG. 5 depicts a flow diagram for managing data flows at a NIC in accordance with an embodiment.

FIG. 5 depicts a process flow for managing data flows at a NIC attached to or integrated with a host. The data flows originate from one or more VMs of the host. In an embodiment, the process flow shown in FIG. 5 is performed by the NIC 412 of FIG. 4. At block 502, multiple logical queues are created from a physical buffer associated with a port of the NIC. The physical buffer is for storing packets before the packets are sent out of the host through the physical port of the NIC. The NIC is configured to partition the physical buffer into a number (e.g., eight) of logical queues. At block 504, different priority levels are assigned to the logical queues created at block 502. In an embodiment, the NIC controls the data rate for the packets stored in the logical queue based on the priority levels assigned to the logical queues.

At block 506, a packet from is received from a virtual forwarding element operating in the host. This packet originates from a VM operating in the host and is forwarded by the virtual forwarding element to the NIC because the packet's destination is in another host. This packet is also encapsulated with a network identifier by the virtual forwarding element. The network identifier identifies a virtual overlay network by which the VM is connected to other end systems of the same tenant.

At block 508, a data flow to which the packet belongs is mapped to a tunnel. Tunnels connecting the host to other hosts may have been created previously when the hosts were set up for the data center environment. In an embodiment, the NIC maps the data flow to the tunnel based on the location of the packet's destination (e.g., the network addresses of the host hosting the packet's destination). In an embodiment, the block 508 is performed only when the packet is an initial packet of the data flow. For the subsequent packet of the data flow, the mapping between the data flow and the tunnel is used to identify the tunnel.

At block 510, the packet is encapsulated with a tunnel header. This tunnel header defines the tunnel to which the data flow is mapped at block 508. In an embodiment, the tunnel header includes the network addresses of the hosts as the source and destination addresses.

At block 512, the data flow to which the packet belongs is mapped to a logical queue. In an embodiment, the NIC 412 maps the data flow to a logical queue based on the priority level to which the data flow is assigned. In an embodiment, the virtual forwarding element decides the priority level that a data flow should get. The priority level assignment may also be based on the network identifiers in order to discriminate traffic for different virtual overlay networks. In an embodiment, the block 512 is performed only when the packet is an initial packet of the data flow. For the subsequent packet of the data flow, the mapping between the data flow and the logical queue is used to identify the logical queue. At block 514, the packet is placed in the logical queue.

By mapping data flows to tunnels at block 508 and to the logical queues at block 512, the NIC creates a mapping between the data flows, the logical queues, and the tunnels. Using this mapping, the NIC may apply flow control schemes (e.g., data rate adjustment, QoS, etc.) to the tunnels by applying the schemes to the logical queues that are mapped to the tunnels.

Figure 6:
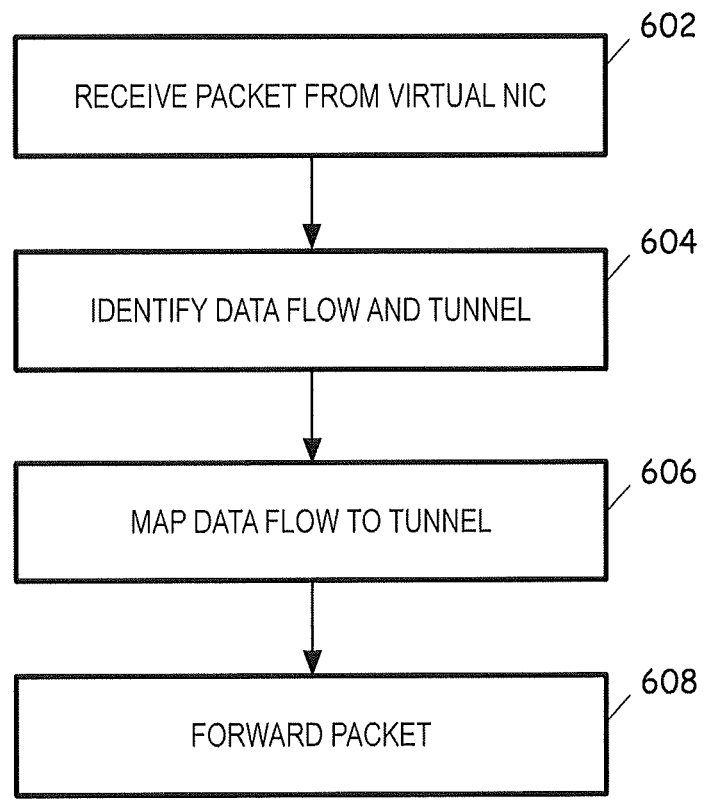
FIG. 6 depicts a flow diagram for managing data flows at a physical forwarding element in accordance with an embodiment.

FIG. 6 depicts a process flow for managing data flows at a physical forwarding element (e.g., a switch, a gateway, etc.). The physical forwarding element is connected to a NIC of a host that hosts several VMs from which the data flows originate. In an embodiment, the physical forwarding element is a gateway at an edge of a network that connects the hosts in a data center environment. In an embodiment, the process flow shown in FIG. 6 is performed by the physical forwarding element 428 of FIG. 4. At block 602, a packet is received from the NIC. The packet is encapsulated with a network identifier and a tunnel header. The tunnel header's source and destination addresses include the network addresses of the host and another host or overlay gateway switch.

At block 604, a data flow to which the packet belongs and a tunnel in which the data flow is being transmitted are identified. In an embodiment, the physical forwarding element is configured to look into the network identifier and the inner header of the packet to identify the data flow for the packet. Specifically, the physical forwarding element is configured to look at the source and destination network addresses in the inner header. The physical forwarding element may identify the data flow uniquely based on these network addresses and the network identifier. The physical forwarding element identifies the tunnel by looking at the tunnel header of the packet.

At block 606, the data flow is mapped to the tunnel. In one embodiment, the physical forwarding element maps the data flow (e.g., the source and destination addresses of the inner packets and the network identifier) to the tunnel (e.g., the network addresses of the hosts in which the source and destinations of the inner packets operate).

At block 608, the packet is forwarded out from the physical forwarding element. The packet is then forwarded by the network components of the network based on the information stored in the tunnel header. That is, the network components that are oblivious to the network identifier and the inner header of the encapsulated packet forward the packet to the other endpoint of the tunnel.

Figure 7:
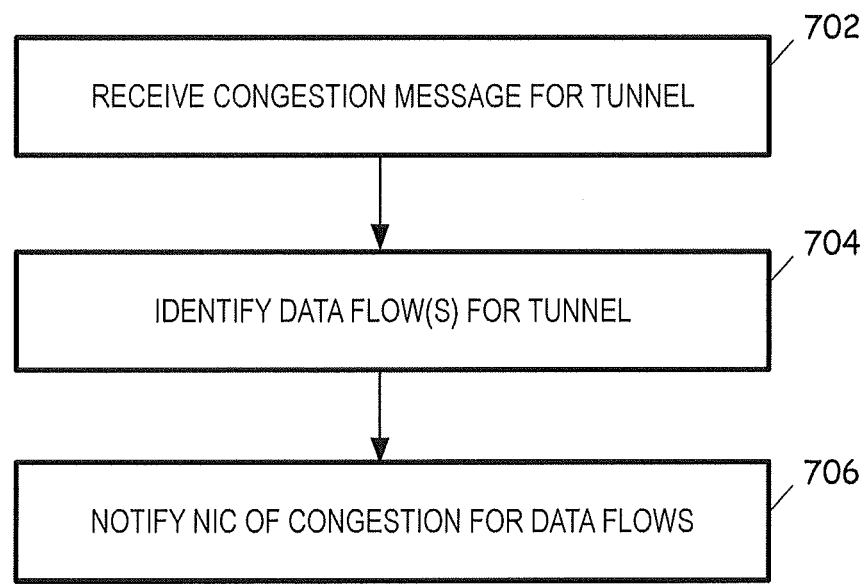
FIG. 7 depicts a flow diagram for handling a congestion message in accordance with an embodiment.

FIG. 7 depicts a process flow for handling a congesting message using a mapping between data flows and tunnels at a physical forwarding element. In an embodiment, the physical forwarding element is the same physical forwarding element that performs the process flow shown in FIG. 6. In an embodiment, the process flow shown in FIG. 7 is performed by the physical forwarding element 428 of FIG. 4. At block 702, a congestion message is received. This congestion message originates from a network component (e.g., a gateway router) in the network that is downstream with respect to the physical forwarding element. The congestion message indicates that the tunneled traffic (e.g., tunneled IP traffic) contributes to the congestion and thus the data rate for the traffic should be adjusted or blocked.

At block 704, one or more data flows are identified for the tunnel. The physical forwarding element identifies the tunnel for which the congestion message is received. The physical forwarding element uses the mapping that is created at block 606 of FIG. 6 to identify the one or more data flows associated with the tunnel. At block 706, the NIC that sends the data flows to the physical forwarding element is notified of the data flows identified at block 704. The NIC may adjust data rates for the data flow(s) that contribute to the congestion.

Figure 8:
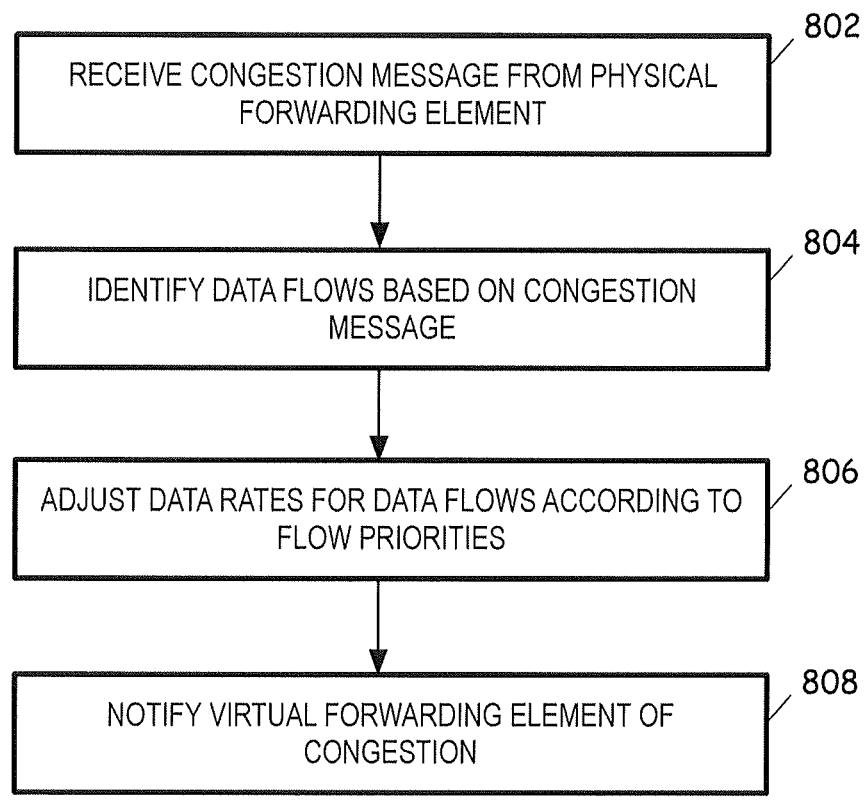
FIG. 8 depicts a flow diagram for configuring virtual forwarding elements in accordance with an embodiment.

FIG. 8 depicts a process flow for handling a congestion message at a NIC. In an embodiment, the NIC is the same NIC that performs the process flow shown in FIG. 5. In an embodiment, the process flow shown in FIG. 8 is performed by the NIC 412 of FIG. 4. At block 802, a congestion message is received from the physical forwarding element. The congestion message sent by the physical forwarding element specifies which of the data flows are contributing to the congestion.

At block 804, one or more data flows that contribute to the congestion are identified based on the congestion message. In an embodiment, the congestion message specifies the data flows with the network identifier and the source and destination addresses of the packets. The NIC uses the mapping created at block 512 of FIG. 5 to identify the logical queues for the data flows.

At block 806, data rates for the data flows identified at block 804 is adjusted. The NIC uses the logical queues associated with the identified data flows to adjust the data rates. At 808, the virtual forwarding element that sends data flows to the NIC is notified of the congestion. In an embodiment, the NIC relays the congestion message received from the physical forwarding element to the virtual forwarding element. In an embodiment, the NIC generates a new congestion message based on the congestion message received from the physical forwarding element at block 802. The virtual forwarding element receives the new message or the relayed message and may adjust data rates for the contributing data flows using its own flow control schemes.

In an embodiment, the NIC generates a congestion message (e.g., a PFC message or Institute of Electrical and Electronics Engineers (IEEE) 802.3x or equivalent message) even if the NIC does not receive any congestion message from the physical forwarding element. In this embodiment, the NIC monitors the logical queues to determine if any of the logical queue is about to overflow. When it is determined that any of the logical queue is about to overflow, the NIC generates a congestion message for the data flow associated with the logical queue and sends the congestion message to the virtual forwarding element.

Technical effects and benefits include the ability to control data rates for the data flows on a per-flow basis at a NIC and the ability to recognize different data flows at a physical forwarding element that receives the data flows from the NIC.

As will be appreciated by one of average skill in the art, aspects of embodiments may be embodied as a system, method or computer program product. Accordingly, aspects of embodiments may take the form of an entirely hardware embodiment, an entirely software embodiment (including firmware, resident software, micro-code, etc.) or an embodiment combining software and hardware aspects that may all generally be referred to herein as, for example, a "circuit," "module" or "system." Furthermore, aspects of embodiments may take the form of a computer program product embodied in one or more computer readable storage device(s) having computer readable program code embodied thereon.

One or more of the capabilities of embodiments can be implemented in software, firmware, hardware, or some combination thereof. Further, one or more of the capabilities can be emulated.

An embodiment may be a computer program product for enabling processor circuits to perform elements of the invention, the computer program product comprising a computer readable storage medium readable by a processing circuit and storing instructions for execution by the processing circuit for performing a method.

The computer readable storage medium (or media), being a tangible, non-transitory, storage medium having instructions recorded thereon for causing a processor circuit to perform a method. The "computer readable storage medium" being non-transitory at least because once the instructions are recorded on the medium, the recorded instructions can be subsequently read one or more times by the processor circuit at times that are independent of the time of recording. The "computer readable storage media" being non-transitory including devices that retain recorded information only while powered (volatile devices) and devices that retain recorded information independently of being powered (non-volatile devices). An example, non-exhaustive list of "non-transitory storage media" includes, but is not limited to, for example: a semi-conductor storage device comprising, for example, a memory array such as a RAM or a memory circuit such as latch having instructions recorded thereon; a mechanically encoded device such as punch-cards or raised structures in a groove having instructions recorded thereon; an optically readable device such as a CD or DVD having instructions recorded thereon; and a magnetic encoded device such as a magnetic tape or a magnetic disk having instructions recorded thereon.

A non-exhaustive list of examples of computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM). Program code can be distributed to respective computing/processing devices from an external computer or external storage device via a network, for example, the Internet, a local area network, wide area network and/or wireless network. The network may comprise copper transmission cables, optical transmission fibers, wireless transmission, routers, firewalls, switches, gateway computers and/or edge servers. A network adapter card or network interface card in each computing/processing device receives a program from the network and forwards the program for storage in a computer-readable storage device within the respective computing/processing device.

Computer program instructions for carrying out operations for aspects of embodiments may be for example assembler code, machine code, microcode or either source or object code written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable storage medium that can direct a computer, other programmable data processing apparatus, or other devices to function in a particular.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer implemented method for managing data flows at a network interface card (NIC) attached to a host, the NIC comprising a port, the method comprising:
    receiving, from a virtual forwarding element executing in the host, a packet that belongs to a data flow;
    identifying, by the NIC, one of a plurality of queues for storing the data flow to be sent out of the host through the port and one of a plurality of tunnels, the tunnel being between the host and another host comprising a destination of the packet, to create a mapping between the data flow, the one of the plurality of queues, and a plurality of tunnels; and
    applying flow control on the one of the plurality of tunnels by applying flow control on the one of the plurality of queues, by the NIC, the flow control including control of a data rate for transmission of the data flow, based on the mapping between the data flow, the one of the plurality of queues, and the one of the plurality of tunnels.

2. The method of claim 1, wherein the plurality of queues are logical queues, the method further comprising creating the plurality of logical queues from a physical buffer associated with the port.

3. The method of claim 1, further comprising encapsulating, by the NIC, the packet with a tunnel header that defines the tunnel between the host and the another host comprising the destination of the packet.

4. The method of claim 3, wherein the tunnel header includes network addresses of the hosts.

5. The method of claim 1, wherein the virtual forwarding element attaches a network identifier to the packet before sending the packet to the NIC.

6. The method of claim 1, wherein the virtual forwarding element receives different data flows from different virtual machines executing on the host through different virtual ports of the virtual forwarding element and forwards the different data flows to the NIC.

7. The method of claim 1, further comprising:
    receiving a congestion message from a forwarding element that is downstream with respect to the NIC, the message indicating that one or more particular data flows contribute to a network congestion;
    identifying one or more particular queues of the plurality of the queues associated with the one or more particular data flows according to a mapping between the one or more particular data flows and the one or more particular queues and one or more particular tunnels by the NIC; and
    adjusting associated one or more data rates for the particular data flows by adjusting associated one or more data rates of the one or more particular queues to control associated one or more data rates of the one or more particular tunnels.

8. The method of claim 7, further comprising notifying the virtual forwarding element of the congestion message.

* * * * *